United States Patent [19]

Mohri et al.

[11] Patent Number: 5,021,272

[45] Date of Patent: Jun. 4, 1991

[54] OVERHEAD PROJECTOR SHEET FOR PRINTING BY THERMAL TRANSFER PRINTING AND METHOD OF PRINTING THE SAME

[75] Inventors: Hidemasa Mohri; Michiaki Tobita, both of Yokohama; Masahiko Ishida, Fujisawa, all of Japan

[73] Assignee: Taiho Industries Co., Ltd., Tokyo, Japan

[21] Appl. No.: 237,271

[22] Filed: Aug. 25, 1988

[30] Foreign Application Priority Data

Aug. 25, 1987 [JP] Japan ................................ 62-209282

[51] Int. Cl.$^{5}$ ............................ B32B 7/06; B32B 7/12

[52] U.S. Cl. ...................................... 428/40; 428/192; 503/227

[58] Field of Search ................. 428/40, 192, 195, 514; 503/227

[56] References Cited

U.S. PATENT DOCUMENTS

| | | | |
|---|---|---|---|
| 3,925,584 | 12/1975 | Suzuki et al. | 428/40 |
| 4,741,969 | 5/1988 | Hayama et al. | 428/514 |
| 4,746,646 | 5/1988 | Nakanishi et al. | 428/514 X |
| 4,783,375 | 11/1988 | Hashimoto et al. | 428/195 X |
| 4,879,166 | 11/1989 | Misuda et al. | 428/212 |

FOREIGN PATENT DOCUMENTS

| | | | |
|---|---|---|---|
| 61-106293 | 5/1986 | Japan | 503/227 |
| 452479 | 5/1968 | Switzerland | 428/192 |

*Primary Examiner*—Henry F. Epstein

*Attorney, Agent, or Firm*—Oblon, Spivak, McClelland, Maier & Neustadt

[57] ABSTRACT

A method for thermal transfer printing on an OHP sheet, comprising the steps of laying a backing sheet on a surface of said OHP sheet opposite a printing surface thereof, and conducting printing the printing surface of said OHP sheet by the use of a thermal transfer printer.

13 Claims, 3 Drawing Sheets

OVERHEAD PROJECTOR SHEET FOR PRINTING BY THERMAL TRANSFER PRINTING AND METHOD OF PRINTING THE SAME

BACKGROUND OF THE INVENTION

1. Field of the Invention

This invention relates to an overhead projector sheet (hereinafter simply referred to as "OHP" sheet) which is printable by thermal transfer printing, in which an image of desired printing quality can be obtained using a thermal transfer printer, and to a method for thermal transfer printing on the OHP sheet.

2. Prior Art Statement

Various printers have been put to practical use, such as impact type printers, typically wire dot type printers, and nonimpact type printers, typically ink jet type or thermal transfer type printers.

Further, many kinds of thermal transfer printers have also been put to practical use and OHP sheets for thermal transfer printing have also been proposed.

For example, there has been proposed an OHP sheet comprising a transparent film applied thereon with a rubber based adhesive layer, an acryl based adhesive layer or a polyester based adhesive layer. There has also been proposed an OHP sheet provided with a coating layer including a solid wax having a good compatibility with a thermal fusible ink (Japanese Patent Public Disclosure Sho 60(1985)-154096).

There are two types of thermal transfer printers, the serial type and the line type. The line printer is superior to the serial printer in terms of printing speed.

For obtaining color images using a line type color thermal transfer printer, there have been developed drum, rocking and multihead printers which use an ink ribbon applied with ink materials of various colors along its longitudinal direction. In this case, with the exception of the multihead printers, the material to be printed has to be reciprocally moved three to four times between a head and a platen or drum in order to print, for example, three to four colors of ink onto the material to be printed.

This printing system will now be described with reference to a color thermal transfer printer of drum type as shown in FIG. 1. A material 6 to be printed is wound around a rotary drum 1 such that one end of the material 6 is retained by a clamp portion 1*a*, whereas an elongated ink ribbon 5 applied, in turn, with ink materials of various colors along its longitudinal direction is contacted with the outer peripheral portion 1*b* of the rotary drum 1 from a feed roller 2 and the leading end thereof is taken up by a take-up roller 3.

During printing, the rotary drum 1 is rotated in the direction E (counterclockwise) and the take-up roller 3 is rotated to take up the ink ribbon 5 so that the ink material for the first color will be brought to the outer peripheral portion 1*b* of the rotary drum 1, and a thermal head 4 is moved toward the material 6 to be printed on the outer periphery 1*b* of the rotary drum 1 in such a manner as to press onto the ink ribbon 5. By this, the ink material of the first color on the ink ribbon 5 is heated, melted and transferred to the material 6 to be printed. When one color has been printed on one image plane, the rotary drum 1 is rotated in the direction F (clockwise), i.e., the opposite direction to that during printing, so as to feed the material 6 to be printed reversely, or the rotary drum 1 is rotated further in the direction E to feed the material 6 normally so that the leading edge of the image plane of the material 6 is returned to the position where the thermal head 4 is located, the ink ribbon 5 is taken up in such a manner as to bring the ink material for the second color to the outer periphery of the drum, the ink material is pressed against and transferred to the material 6 to be printed by the thermal head 4, and this procedure is repeated as many times as the number of colors.

FIG. 2 shows another example of the drum type, color thermal transfer printer. In this case, the material 6 to be printed is retained at its one end by the clamp portion 1*a* of the rotary drum 1 via the platen 7. On the other hand, the ink ribbon 5 is urged against the material 6 on the platen 7 by the movement of the thermal head 4. By this, the first color ink material of the ink ribbon 5 is melted and transferred to the material 6 to be printed.

When the first color has been printed by the thermal head 4, the rotary drum 1 is rotated in the opposite direction to the direction toward which the rotary drum 1 was rotated during printing. As a result, the material 6 is reversely moved on the platen 7 so that the leading edge of the image plane is returned to the position where the thermal head 4 is located, thereby to print the next color.

More specifically, where a single color image is to be obtained with a line thermal transfer printer, or where a multicolor image is to be obtained with a multihead thermal transfer printer, the material to be printed is required to be passed between the thermal head and the platen or rotary drum only once. On the other hand, where a multicolor image is to be obtained using a color thermal transfer printer of drum type or rocking type, the material to be printed is passed between the thermal head and the platen or rotary drum as many times as the number of colors.

The material to be printed is reciprocally moved by a belt, a roller, etc. within the printer. During the reciprocal movement of the material to be printed, the printing surface and the rear surface of the material to be printed are in contact with the belt, the roller, etc.

In the event the material to be printed is a sheet of paper, the above-mentioned contact does not create serious problems. However, in the event the material to be printed is an OHP sheet comprising a transparent film, it often incurs feed scars on its rear surface during reciprocal movement. The result is that when it is projected by an overhead or other type projector, the scarred portions appear as black lines when projected. Thus, the image becomes difficult to see.

If the OHP sheet is reciprocally moved between the thermal head and the platen or rotary drum as mentioned above, a displacement of the dots occurs. The result is that the obtained image is undesirably blurred.

A further disadvantage occurs because heat does not necessarily propagate uniformly through the OHP sheet, particularly at its coated layer on the transparent film. The result is that when an ink material is transferred by a thermal head, etc., an uneven color thickness occurs and, therefore, good quality printing is difficult to obtain.

An additional disadvantage occur because of the fact that since the OHP sheet itself is transparent, if several sheets are placed one upon another, such sheets become difficult to distinguish individually due to reflected light.

OBJECT AND SUMMARY OF THE INVENTION

An object of the present invention is to provide an OHP sheet which is printable by thermal transfer printing, in which dots are not displaced when multicolor printing is conducted using a thermal transfer printer.

Another object of the present invention is to provide a method for printing an OHP sheet, in which feed scars are prevented and an excellent printed image can be obtained.

In order to achieve the above objects, the present invention comprises an OHP sheet thermal transfer printing and a backing sheet laid on the back surface of the OHP sheet. An image is printed on the OHP sheet using a thermal transfer printer.

As described above, a backing sheet is laid on the surface of the thermal transfer OHP sheet opposite to the printing surface thereof so as to protect the back surface of the OHP sheet. Accordingly, the back surface is protected from being scarred by its contact with a belt, roller, etc. during the printing operation, and feed scars do not occur. Moreover, by virtue of the provision of the backing sheet, the intimacy of contact between the OHP sheet and the rotary drum or platen is increased. Accordingly, even if the OHP sheet is reciprocally moved several times between the thermal head and the drum or platen, displacement of the dots does not occur. If a nontransparent sheet or colored sheet is used as the backing sheet, handling becomes easy because the sheet can be easily discerned.

The above and other objects and features of the invention will become more apparent from the following detailed description with reference to the accompanying drawings.

DETAILED DESCRIPTION OF THE PREFERRED EMBODIMENT

Figure 1:
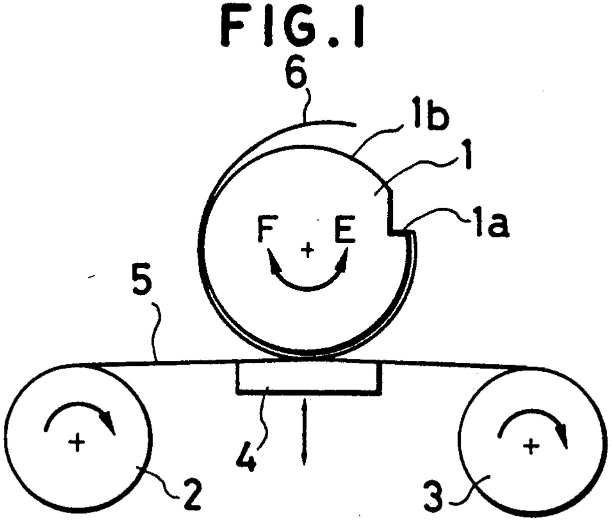
FIG. 1 is a schematic view showing full color image printing using one embodiment of a drum type color thermal transfer printer.

The inventors of the present invention studied ways to overcome the above-mentioned problems which occur when printing is conducted on an OHP sheet using a thermal transfer printer. As a result, they found that when printing is conducted on a thermal transfer OHP sheet with a backing sheet laid on the surface of the OHP sheet opposite the printing surface thereof, substantially no blurring occur even when multicolor printing is performed and thus, a clean printed image can be obtained. The present invention has been accomplished based on this finding.

Known OHP sheets can be used in this invention. Concretely, there may be used a sheet comprising a transparent film of such as polyethylene terephthalate, particularly preferably a biaxial oriented polyethylene terephtalate having a film thickness of 25 to 100 μm, a polycarbonate or a polyacetate. The printability of the printing surface of such a sheet can be enhanced by applying thereon a rubber based adhesive layer, an acryl based adhesive layer, a polyester based adhesive layer, or a coating layer including a solid wax having good compatibility with the thermal fusible ink of an ink ribbon.

As backing sheets usable in the present invention, there can be mentioned paper, synthetic paper and plastic sheets.

Where paper is used, it should be flexible and have a thickness as required for conveyance within the printer. Examples of such paper are coat paper, machine coated paper, semi-pure paper, pure paper, laminated paper, glassine paper, oil proof paper, napkin paper, machine glazed paper, clay art paper, casein art paper, kraft paper, simili paper, white machine glazed paper, Indian paper, etc.

Where synthetic paper is used, it should be flexible and have a thickness as required for conveyance within the printer. For example, a synthetic paper manufactured by a film process or the like can be used.

As synthetic papers manufactured by a film process, there can be mentioned those produced by blending a filler and an additive with the synthetic resin, melting and kneading the resultant blend and then extruding it as a film using an extruder, those manufactured by an extruding method in which the sheet is further drawn so that it acquires micro holes, those manufactured by a surface coating method in which a coating layer including a pigment and a filler is formed on the surface of a plastic film, and those manufactured by a surface processing method using chemicals and sand blasting, in which the surface of a plastic film is subjected to physical and/or chemical treatment. Any one of the above mentioned synthetic sheets can be used as a suitable material.

Where a plastic sheet is used, it should be flexible, have a smooth surface and be of a thickness as required for conveyance within the printer, but there are no particular restrictions on its composition, construction and structure. Examples of such a sheet are those produced from polyethylene, polypropylene, polystyrene, polyvinyl chloride, polyvinylidence chloride, polyvinyl alcohol, fluororesin, polycarbonate, cellulose acetate, polyester, polyamide, polyimide, polyphenyleneoxide, polysulfone, poly-4-methylpentene-1, polyparaxylene, rubber hydrochloride, polyurethane and ionomer. Also, there can be used a laminated plastic sheet consisting of a plurality of the above-mentioned plastic sheets laminated together or a lamination layer sheet formed by subjecting an above-mentioned sheet to a surface treatment such as depositing, coating or antistatic treatment.

As a preferable backing sheet material for avoiding displacement of dots, there can be mentioned, in particular, synthetic paper manufactured by a film process, plastic sheet, etc. selected from the ones mentioned above.

Preferable materials for avoiding blurring and improving printing performance of the OHP sheet are, in particular, such papers as coat paper, machine coated paper, semi-pure paper, pure paper, laminated paper, glassine paper, oil proof paper, napkin paper, machine glazed paper, clay art paper, casein art paper, kraft paper, simili paper, white machine glazed paper and Indian paper, synthetic paper manufactured by a film process and plastic sheet, all selected from among the above-mentioned backing sheets.

Furthermore, in order to prevent the overlaid OHP sheets from becoming difficult to see due to reflected light, the backing sheet is preferably colored, rather than colorless and transparent, or is a nontransparent sheet. Particularly preferably, it is a white sheet. Since synthetic papers and white plastic sheets are nontransparent, either of these is a suitable material.

In order to prevent the separation of the overlaid OHP sheet and the backing sheet during printing, for example, the upper end portions of the overlaid OHP sheet and the backing sheet may be attached together. However, if materials are selected such that the OHP sheet and the backing sheet are electrostatically attracted when overlaid each other, it is not necessary to attach them together at the ends thereof.

Figure 2:
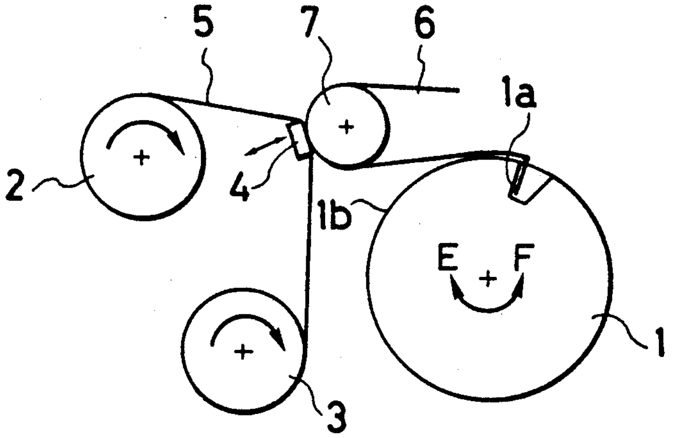
FIG. 2 is a schematic view showing full color image printing using another embodiment of a drum type color thermal transfer printer.

If the overlaid OHP sheet and the backing sheet are attached together, displacement of the dots during printing can be more effectively avoided. However, a study by the present inventors showed that attachment of the OHP sheet and the backing sheet at the clamp portion 1*a* of the rotary drum 1 in a drum type, color thermal transfer printer as shown in FIGS. 1 and 2 is not so effective toward avoidance of the displacement of the dots.

Figure 3:
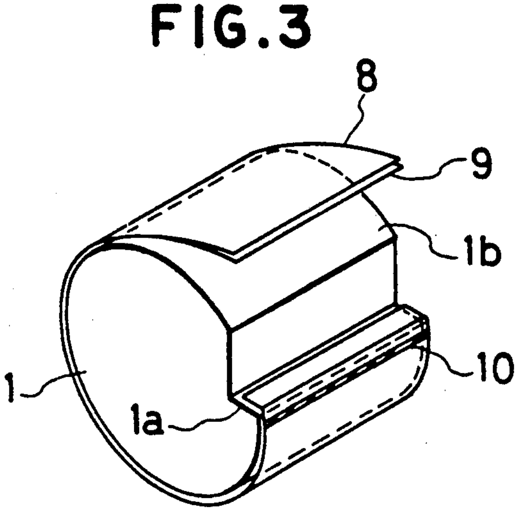
FIG. 3 is a perspective view showing a rotary drum of a thermal transfer printer with an OHP sheet wound therearound.
Figure 4A:
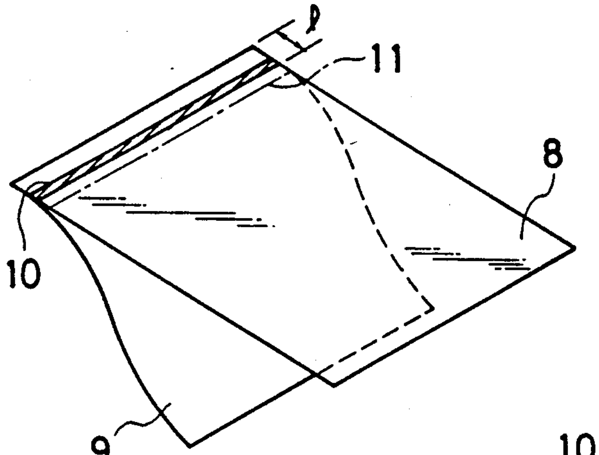
FIGS. 4(*a*), 4(*b*), 4(*c*), 4(*d*), 4(*e*), 4(*f*) and 4(*g*) each is a perspective view showing an OHP sheet with a backing sheet attached to its back surface in a printing method of the present invention in which a color thermal transfer printer is used.
Figure 4B:
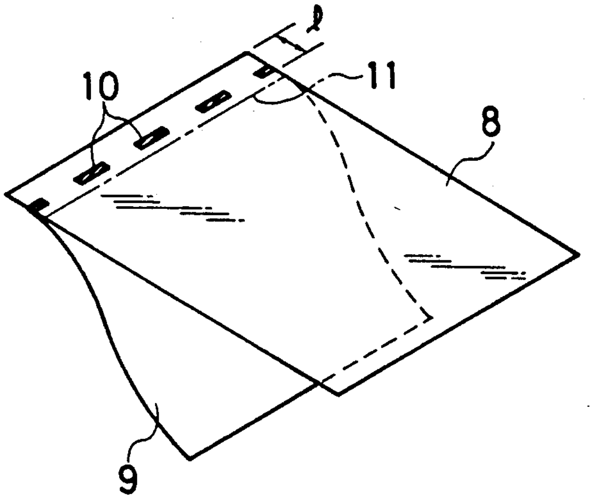
Figure 4C:
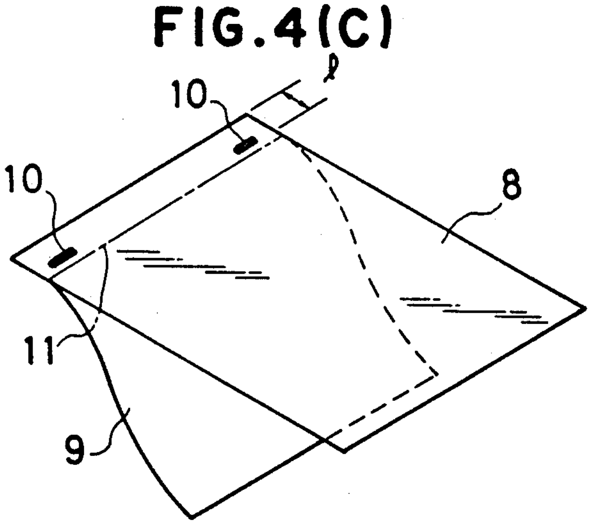
Figure 4D:
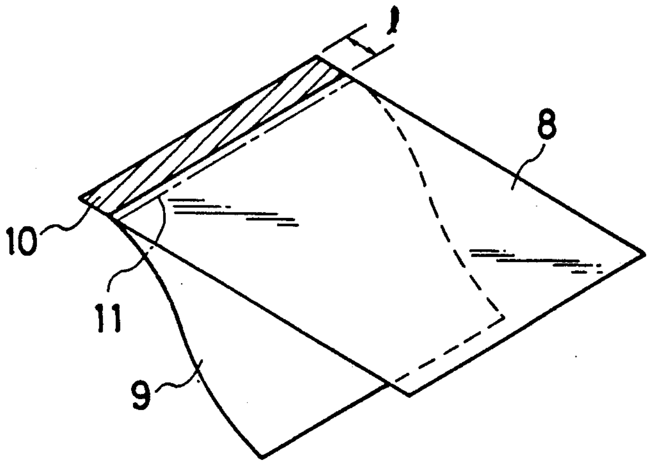
Figure 4E:
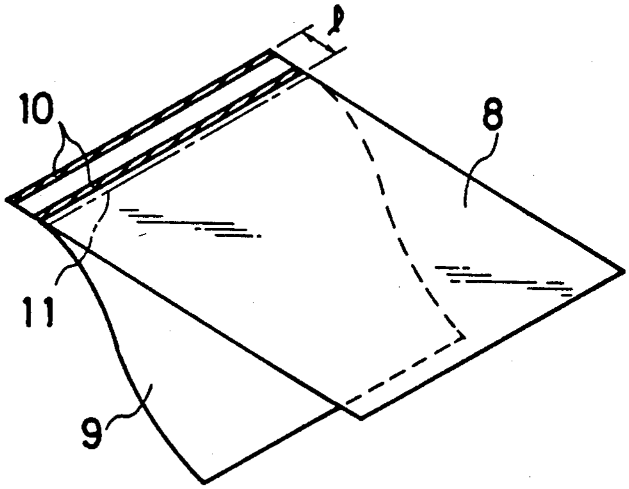
Figure 4F:
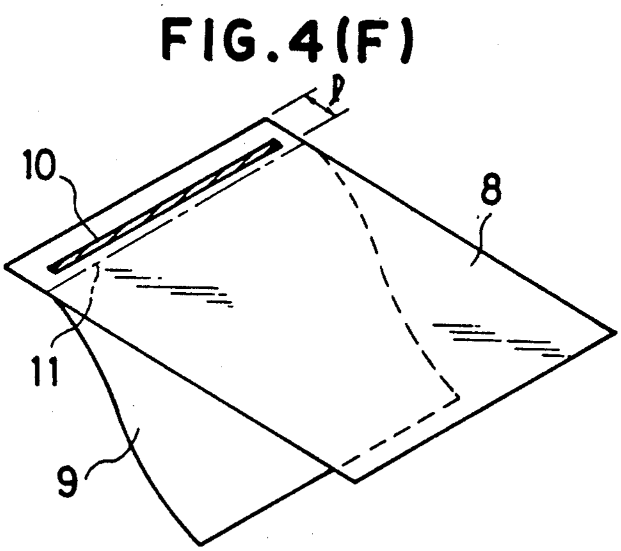
Figure 4G:
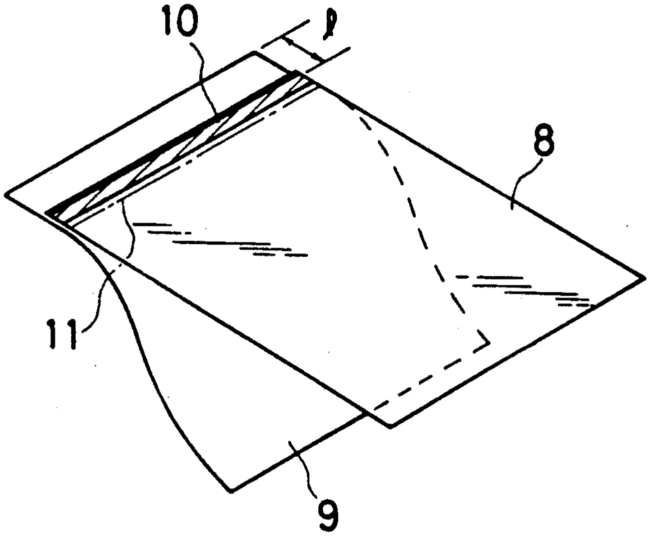

On the contrary, it was also made found that if the overlaid OHP sheet 8 and the backing sheet 9 are attached together so that the attaching portions 10 are situated at a position along the external periphery of the outer peripheral portion lb of the drum 1 when the end portions of the OHP sheet 8 and the backing sheet 9 are clamped by the clamp portion 1*a* of the rotary drum 1 as shown in FIG. 3 and if the printing is performed in the foregoing state, the displacement of the dots can be suppressed. The attached portion 10 of the two sheets is formed using a bonding agent or double-faced tape which enables later detachment. Where the attachment is attained by use of a double-faced tape, it is preferable to use an arrangement by which the tape will always remain on the backing sheet side when the two sheets are separated. This can be realized by using a tape that has a narrower adhesive strip on the side in contact with the OHP sheet or one which uses a weaker bonding material on this side.

FIG. 4 illustrates several modes of attachment between the OHP sheet 8 and the backing sheet 9.

In the Figure, the distance l indicates the position from which the OHP sheet falls on the outer peripheral portion 1*b* of the rotary drum 1 when it is set in place on the drum 1 and the reference numeral 11 indicates the printing start portion. The attaching portion or portions 10 between the OHP sheet 8 and the backing sheet 9 is/are provided continuously along a line offset from the edge of the sheet by the distance l as shown in FIG. 4(*a*), discontinuously along the said line as shown in FIG. 4(*b*), at both end portions of the said line as shown in FIG. 4(*c*), over the entire region from the sheet edge to the said line as shown in FIG. 4(*d*), continuously along the said line and also at the upper edge portion of the overlaid OHP sheet and the backing sheet as shown in FIG. 4(*e*) or continuously along the said line but with a space at each end thereof as shown in FIG. 4(*f*). Alternatively, the edge of the OHP sheet can be aligned with a line offset from the edge of the backing sheet 9 by the distance l and the two sheets can be attached along this line, as shown in FIG. 4(*g*).

According to the present invention, since the back surface of the OHP sheet is protected by the backing sheet, it is does not suffer feed scars which would otherwise occur on the back surface of the OHP sheet when it is conveyed within the printer. Thus a clear image can be obtained.

Furthermore, by using as the backing sheet a nontransparent white or colored sheet, such as of synthetic paper or plastic sheet, the OHP sheets can be prevented from becoming difficult to see when overlaid.

Furthermore, by using the above-mentioned paper or synthetic paper manufactured by the film process, or a plastic sheet, etc. as the backing sheet, color unevenness can by eliminated and printing performance can be improved.

The mechanism by which the invention eliminates color unevenness and improves the printing performance is not altogether clear. However, where a material such as mentioned above is used as the backing sheet, it seems that when the thermal head is heated upon pressing the ink ribbon against the surface of the OHP sheet, the ink material is melted out of the ink ribbon and transferred onto the printing surface of the OHP sheet while at the same time heat flows evenly to the backing sheet so that the ink transferred onto the OHP sheet is evenly cooled, and all of the ink material on the ribbon is thermally transferred to surface of the OHP sheet, whereby color unevenness is avoided.

Furthermore, in the present invention, by providing a backing sheet on the surface of the OHP sheet opposite the printing surface thereof the intimacy of contact between the OHP sheet and the platen or rotary drum can be increased. As a result, the OHP sheet returns to its original position after it is reciprocally moved between the head and the platen or rotary drum. Therefore, no displacement of the dots occurs when the OHP sheet is printed.

Furthermore, where a drum type color thermal transfer printer is used, the OHP sheet and backing sheet overlaid in the manner as shown in FIGS. 3 and 4 are attached at the outer periphery of the rotary drum which hits the external periphery of the clamp portion of the rotary drum, thereby to prevent displacement of the dots during printing.

Examples of the present invention will now be described. However, it is understood that the present invention is not limited to these Examples.

EXAMPLE 1

Polyethylene terephtalate sheets of A4 size having a thickness of 50 $\mu$m was used as an OHP sheet. Each of the various backing sheets shown in Table 1 and having the same dimensions as the OHP sheet was overlaid on the back surface of the OHP sheets and attached thereto at a place 20 mm away from the upper end of the OHP sheet by using a pressure sensitive adhesive double-faced tape in the manner as shown in FIG. 4(*a*). Then, the upper end portion of the sheet was folded by approximately 8 mm and clamped by a clamp portion of the rotary drum of a printer. Then, the sheet was set and printed. The printing was checked with respect to four items, i.e., feed scars, discernibility in the presence of reflecting light, displacement of the dots and unevenness of color. The results are shown in Table 2. The printer used was a color scanner printer CX-5000 manufactured by Sharp Co., Inc., Japan.

The evaluations in Table 2 were made as follows;

1) Feed Scars:

Characters were printed in black ink. After printing, the OHP sheet was visually checked in order to learn whether vertical scars were present due to feeding.

o: Feed scars not present.

x: Feed scars present.

2) Discernibility in the presence of reflecting light:

Characters were printed in black ink. The OHP sheet with a backing sheet attached thereto was placed on a newspaper and checked as to whether the printed characters were easily discernible at a distance of 2 m.

o: All characters clearly readable.

Δ: All characters readable but not easily because the ground color was dark.

x: Characters not readable at all because they were difficult distinguish from the characters of the newspaper.

3) Displacement of the dots:

Intersecting lines spaced at 1 mm were printed on an OHP sheet with yellow ink. Then, the same intersecting lines were printed on the OHP sheet with magenta ink. Thereafter, the red lines formed where the yellow and magenta lines overlapped were observed with a microscope to measure the dot displacement.

4) Unevenness of color:

Characters were printed in yellow and cyanic colors all over the OHP sheet. After the printing, the OHP sheet L was visually checked for unevenness of color.

o: No unevenness of color at all.

Δ: Slight unevenness of color.

x: Unevenness of color all over the sheet.

TABLE 1

| Test No. | Backing sheet | Thickness (μm) | Tradename | Symbol | Maker |
|---|---|---|---|---|---|
| 1 | Synthetic sheet, Film process, Extruding method | 60 | Yupo | FGP#60 | Oji Yuka K.K. |
| 2 | Synthetic sheet, Film process, Extruding method (Single surface strength increased) | 80 | Yupo | SGG#80 | Oji Yuka K.K. |
| 3 | Synthetic sheet, Film process, Extruding method (Double surface strength increased) | 80 | Yupo | KPG#80 | Oji Yuka K.K. |
| 4 | Synthetic sheet, Film process, Surface processing | 50 | Teijin (Sand mat film) | — | Teijin Ltd. |
| 5 | Synthetic sheet, Film process, Surface coating (Base polypropylene) | 65 | Beach coat | WPR70 | Nisshin Boseki K.K. |
| 6 | Synthetic sheet, Film process, Surface coating (Base polystyrene) | 135 | Beach coat | WG140 | Nisshin Boseki K.K. |
| 7 | Synthetic sheet, Film process, Surface coating (Base polyester) | 110 | Beach coat | WE110 | Nisshin Boseki K.K. |
| 8 | Polyester sheet | 100 | Lumirror | T | Toray Ind. Inc. |
| 9 | White polyester sheet | 100 | PT film | — | Fuji Photo Film Co., Ltd. |
| 10 | White vinyl chloride sheet | 130 | — | — | — |
| 11 | Laminate sheet (nylon/polyethylene/aluminium/polyethylene) | 95 | — | — | — |

Comparative Example 1: Only OHP sheet with no backing sheet attached.
Comparative Example 2: Xerox sheet having a thickness of 7 μm manufactured by Fuji Xerox Co. Ltd. was used as the OHP sheet.

TABLE 2

| Test No. | Feed scars | Discernibility in reflecting light | Displacement of dots (μm) | Unevenness of color |
|---|---|---|---|---|
| 1 | O | O | 5 | O |
| 2 | O | O | 0 | O |
| 3 | O | O | 3 | O |
| 4 | O | Δ | 2 | O |
| 5 | O | O | 0 | O |
| 6 | O | O | 0 | O |
| 7 | O | O | 5 | O |
| 8 | O | O | 0 | O |
| 9 | O | O | 0 | O |
| 10 | O | X | 3 | O |
| 11 | O | O | 2 | O |
| Comparative example | | | | |

TABLE 2-continued

| Test No. | Feed scars | Discernibility in reflecting light | Displacement of dots (μm) | Unevenness of color |
|---|---|---|---|---|
| 1 | X | X | 50 | O |
| 2 | O | O | 70 | X |

EXAMPLE 2

A polyethylene terephtalate film with a polyester based adhesive layer (tradename: T206, manufactured by Taiho Industrial Co., Ltd., Japan) of A4 size having a thickness of 50 μm was used as an OHP sheet. A synthetic sheet (tradename: Yupo FPG80, manufactured by Oji Yuka K.K.) of the same size and having a thickness of 80 μm was laid on the back surface of the film as a backing sheet and attached thereto by a detachable hot melt adhesive. In this way, three sets of such OHP sheets were prepared the first one having the backing sheet attached to the film at a place 2 mm away from its upper end, the second one having it attached to the film at a place 20 mm away from its upper end and the third one having it attached to the film at a place 25 mm away from its upper end.

An 8 mm folded portion at the edge of each such OHP sheets was clamped at its by a clamp portion of a drum type thermal transfer printer (manufactured by Sharp Co., Ltd., model: color scanner printer CX-5000, width of the clamp portion of the rotary drum: 250 mm), wound around the rotary drum of the printer and printed. Then, the positional displacement and the blurring of the dots were evaluated. The results are shown in Table 3.

TABLE 3

| Test No. | Attaching area distance | Positional displacement (μm) | Blurring |
|---|---|---|---|
| 1 | 2 mm | 80 | X |
| 2 | 20 mm | 3 | O |
| 3 | 25 mm | 2 | O |

The evaluation in above table was made as follows.

1) Positional displacement

Intersecting lines spaced at 1 mm were printed on an OHP sheet with magenta ink. Then, the same intersecting lines were printed on the OHP sheet with cyan ink. Thereafter, the purple lines formed where the magenta and cyan lines overlapped were observed with a microscope to measure the dot displacement.

2) Blurring (degree)

The same characters were printed once in magenta and once in cyan at coincident dot positions and blurring was visually observed.

o: Characters clearly readable.

x: Characters could be recognized from their general configuration but could not be read clearly.

It can be seen from the Table 3 that when the attaching portions of the OHP sheet and backing sheet is situated on the outer peripheral surface of a rotary drum, almost no positional displacement of the printed characters and color occur, and a clear image can be obtained.

What is claimed is:

1. An overhead projection sheet for printing by thermal transfer printing comprising an overhead projection sheet of a transparent film, a backing sheet overlaid on a surface of said overhead projection sheet opposite a printing surface thereof and bonding means for detachably attaching a respective one end of said overlaid sheet to one end of said overhead projection sheet.

2. An overhead projection sheet according to claim 1, wherein said bonding means is a bonding agent.

3. An overhead projection sheet according to claim 1, wherein said bonding means is a double-faced tape.

4. An overhead projection sheet according to claim 1, wherein said overhead projection sheet is a polyethylene terephthalate film, a polycarbonate film or a polyacetate film.

5. An overhead projection sheet according to claim 1, wherein said backing sheet is a sheet of paper.

6. An overhead projection sheet according to claim 1, wherein said backing sheet is a synthetic sheet.

7. An overhead projection sheet according to claim 1, wherein said backing sheet is a plastic sheet.

8. An overhead projection sheet according to claim 4, wherein said polyethylene terephthalate film, said polycarbonate film or said polyacetate film is provided with a coating layer for improving the printability of its printing surface.

9. An overhead projection sheet according to claim 8, wherein said coating layer includes a rubber based adhesive layer, an acryl based adhesive layer, a polyester based adhesive layer or a layer including a solid wax having a good compatibility with a thermal fusible ink.

10. An overhead projection sheet according to claim 5, wherein said sheet of paper is coat paper, semi-pure paper, pure paper, laminated paper, glassine paper, oil proof paper, napkin paper, machine glazed paper, clay art paper, casein art paper, kraft paper, simili paper, or Indian paper.

11. An overhead projection sheet according to claim 6, wherein said synthetic sheet is made by a film process.

12. An overhead projection sheet according to claim 7, wherein said plastic sheet is constituted of polyethylene, polypropylene, polystyrene, polyvinyl chloride, polyvinylidene chloride, polyvinyl alcohol, fluororesin, polycarbonate, cellulose acetate, polyester, polyamide, polyimide, polyphenyleneoxide, polysulfone, poly-4-methylpentane-1, polyparaxylene, rubber hydrochloride, polyurethane or ionomer.

13. An overhead projection sheet according to claim 3, wherein said double-faced tape has a strongly adhesive side and a weakly adhesive side, the strongly adhesive side being in contact with the backing sheet and the weakly adhesive side being in contact with the overhead projection sheet.

* * * * *